Jan. 31, 1950
J. W. KUEHN
2,496,009
METHOD FOR RECOVERING MEAL PARTICLES FROM PEANUT SKINS
Filed Feb. 18, 1946
2 Sheets-Sheet 1
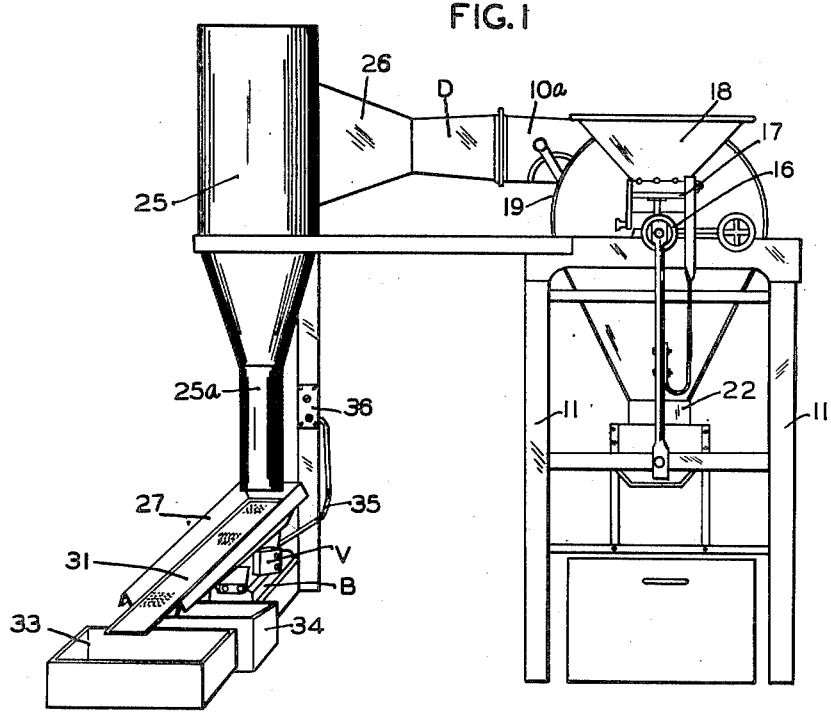
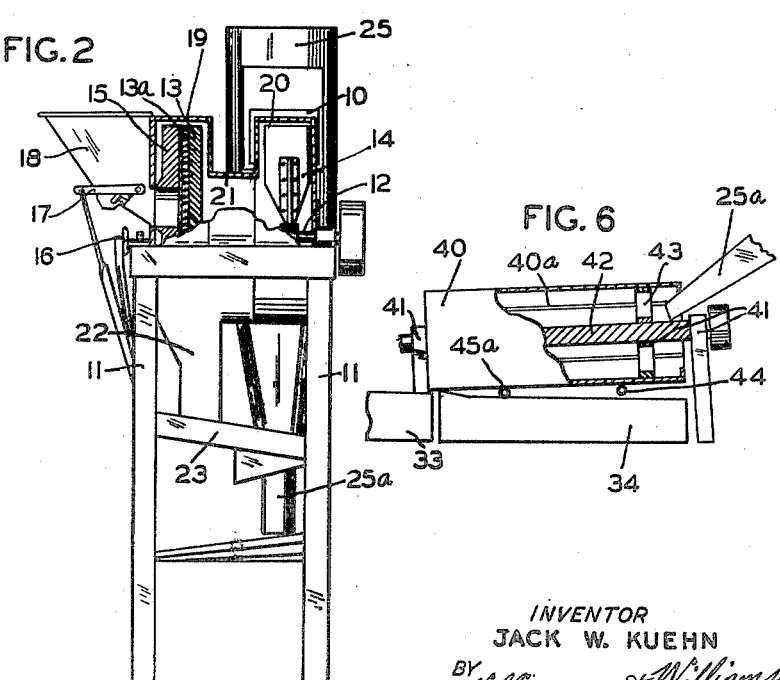
INVENTOR
JACK W. KUEHN
BY Williamson & Williamson
ATTORNEYS Jan. 31, 1950　　　J. W. KUEHN　　　2,496,009
METHOD FOR RECOVERING MEAL PARTICLES
FROM PEANUT SKINS Filed Feb. 18, 1946　　　2 Sheets-Sheet 2

INVENTOR
JACK W. KUEHN
BY Williamson & Williamson
ATTORNEYS

Patented Jan. 31, 1950

2,496,009

UNITED STATES PATENT OFFICE 2,496,009

METHOD FOR RECOVERING MEAL PARTICLES FROM PEANUT SKINS

Jack W. Kuehn, Minneapolis, Minn.

Application February 18, 1946, Serial No. 648,381

2 Claims. (Cl. 241—7)

This invention relates to the manufacture of peanut meal and peanut butter and particularly, to a method and apparatus for recovering the particles of meal or meat which adhere to the light, flexible peanut skins during the fracturing and removal of the skins in the blanching operations.

In most plants for manufacturing peanut meal, peanut butter and processing peanuts to obtain the kernels and substantially whole, divided state, free of skins, hearts and dust, the shells are first removed and thereafter the shelled nuts with the red skins thereon, are fed into socalled blanching machines where the skins are torn and removed and the kernel is split cleanly in half and the heart or germ is loosened as the goods pass between the ribbed surface of a metal plate and a revolving set of brushes. Such machines may be operated continuously and at full capacity and are usually provided with adjustable feed mechanism to deliver the shelled peanuts to the brushes at a uniform rate and usually with adjustments to vary the relationship of brushes and rib plate for the size and characteristics of stock fed. As the stock moves centrifugally outward beyond the brushes and plate the loosened red skins are withdrawn and separated usually by a powerful fan and thereafter are collected and thrown away or sold at a very low price, as chaff.

These skins, in most commercial plants have adhering thereto, small particles of the meat or kernel which I have found aggregates in weight from 1½% to 2¼% of the total weight of the shelled nuts and which aggregates in weight, from 25% to 60% of the total weight of the separated skins with the meal adhering. Thus, in the present blanching operations of shelled peanuts, losses of from 35 pounds to 50 pounds of peanut meal are occasioned in every ton of shelled peanuts processed.

It is an object of my invention to recover by simple method and apparatus, substantially the entire meal which is now being wasted as heretofore explained.

More specifically, it is an object of my invention to provide a simple but highly efficient method and apparatus for progressively and continuously removing from the separated, highly flexible red skins, substantially all of the adhering particles of meat or meal.

I have discovered that if the flexible red skins are progressively discharged without substantial accumulation or in more or less a thin film upon a receiving surface and thereafter, are simultaneously agitated, tumbled and frictionally rubbed while being progressed through a predetermined path to make the processing continuous, the said closely adhering particles will be shaken off or otherwise removed from the skins and then may be separated by sifting or other means.

I have discovered several highly satisfactory devices or apparatus for carrying out my method successfully to the end that recovery of the adhering meal or meat, is substantially complete.

Another object of my invention therefor, has been to provide simple and highly efficient apparatus well adapted for use with commercial peanut blanching apparatus for removing from the separated, flexible skins, substantially all of the meal adhering thereto.

These and other objects and advantages of my invention will be more apparent from the following description made in connection with the accompanying drawings, wherein like reference characters refer to the same parts throughout the several views and in which—

Fig. 1 is a side elevation showing a suitable form of my invention connected with the skin discharge of a conventional type of split-nut blancher, for peanuts;

Fig. 2 is an end elevation of the blanching machine with some portions broken away;

Fig. 6 is a vertical section taken longitudinally through another form of my meal removing mechanism.

Figure 3:
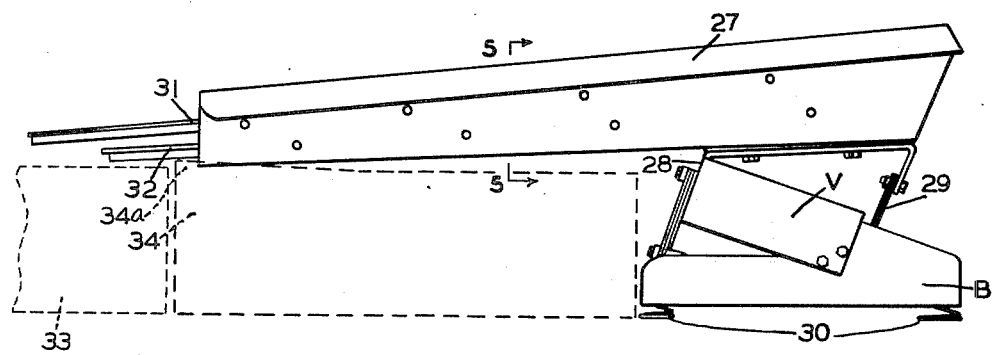
Fig. 3 is a side elevation of one form of my meal removing mechanism detached.

Referring now to Figs. 1 and 2, a highly satisfactory form of my improved apparatus is shown, coupled by a duct D to the tangential blower discharge passage 10a of a blower casing 10, forming a part of a conventional type of split peanut blancher. The blanching machine, as shown, is of a well known type used in commercial peanut butter plants and comprises an upstanding frame 11 having mounted thereon, a transversely disposed rotary shaft 12 to the opposite ends of which are fixed the rotary brush head 13 of the blanching mechanism and blades 14 of a skin removing blower, respectively.

As shown, the rotary head 13 is in the form of a disc having embedded in the outer surface thereof, a series of brush bristles 13a which cooperate with a stationary circular metal plate 15 having on its opposed face, a multiplicity of substantially radial ribs, said ribs being of substantially the height of the average half or split kernel section of a peanut. Mechanism controlled by a hand wheel 16 is as shown, provided for varying the opposed relationship between the ends of the brush bristles 13a and the opposed rib surface of the stationary plate 15. Other mechanism 17 of conventional form, as shown, is provided for automatically controlling the delivery of peanuts through a hopper 18 to the brushes. Removable cylindrical casings 19 and 20 are provided for the blanching mechanism and the skin separating blower, respectively and a cylindrical duct 21 removable with said casings, is provided for centrally connecting the inner end of blancher casing 19 with the intake at the inner end of blower casing 10. A chute 22 is mounted at the bottom of blancher casing 19, receiving the relatively heavy split kernels of the peanuts as well as the hearts or germs and delivering the same to the upper end of an inclined sieve structure 23 which separates off the larger sections and permits dropping of the hearts therethrough. The foregoing structure is conventional and the details thereof need not therefore be described.

In blanching machines of the type previously described, the blower draws the lighter and flexible skins from the periphery of the blanching mechanism where the products are centrifugally discharged pulling such skins with small particles of meal adhering thereto, through the blower casing and discharging the same through the tangential discharge duct 10a.

Figure 4:
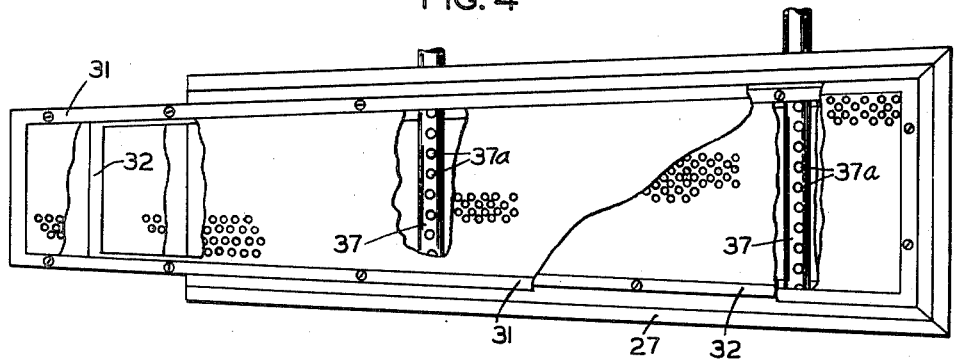
Fig. 4 is a top plan view of the same; of Fig. 3.
Figure 5:
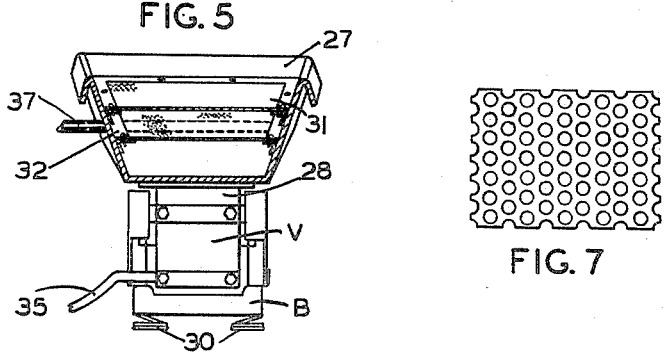
Fig. 5 is a cross section taken on the line 5—5
Figure 7:
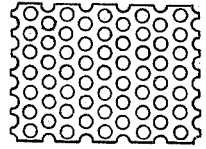
Fig. 7 is a fragmentary plan view on a larger scale of a portion of the upper classifying deck of one form of my meal removal mechanism.

With my apparatus, suitable mechanism is provided for continuously collecting and causing settling of the discharged red skins and with continuous dispensing of said skins at a predetermined point. While other mechanism can be satisfactorily utilized, I prefer to employ a settling chamber 25 of the well known cyclone collector type. This collector as shown, is disposed vertically at one side of the blanching machine; has the usual foraminous or screened upper end and is connected eccentrically or tangentially with duct D by a suitable expansion duct 26. At the bottom of collector chamber 25 a vertical dispensing tube 25a is mounted for dropping, by gravity the settled, flexible skins upon the receiving end of by meal removing mechanism illustrated in Figs. 1, 3 4 and 5. A quite gradually declined straight chute 27 is provided, of generally U-shaped cross section and supported, as shown, from its rear and receiving end by a pair of upwardly extending straps or lugs 28 and 29 respectively, which constitute the attachment portions of a conventional type of pulsating magnet, electric vibrator designated as an entirety by the letter V. For example, this vibrator may be of the type manufactured by Syntron Company of Homer City, Pennsylvania and is adapted to produce high frequency vibrations upon its ends and upon any comparatively light apparatus which is supported therefrom as well as upon the base B to which the vibrator mechanism is attached. I prefer to support the vibrator base upon resilient elements such as a plurality of suitable coil springs 30 to increase the various vibratory impulses imposed upon the chute 27. Chute 27 as shown, is provided with a pair of gradually declined, substantially parallel decks 31 and 32 respectively, said decks extending forwardly from the outer end of said chute for delivery of the material screened by said decks to a box or other receptacle 33 suitably positioned therebelow for collection. The bottom of the chute or trough 27 is preferably constructed of smooth, imperforate material such as non-corrosive metal and is declined slightly from its rear to its forward and delivery end for discharge of the fines or peanut meal recovered into a suitable collection receptacle 34 disposed thereunder and preferably, having an upstanding, cooperating flange 34a opposed in spaced relation to the forward extremity of the bottom of the chute.

Each of the decks, as shown, are in the form of classifying and agitating sieves and may be constructed of suitable flat, perforated sheet metal or woven metal screening of proper mesh to classify and separate the removed meal from the skins or fragments of skin. To this end, as shown, the upper deck 31 is constructed from a closely perforated, thin sheet metal plate having staggered and closely spaced perforations approximating $6/64$ inch in diameter while the lower deck 32 as shown, is also constructed of thin, perforated sheet metal having closely spaced staggered perforations of approximately $4/64$ inch in diameter. The upper deck 31 is thus adapted to remove the large, highly flexible chaff or red skins permitting passage of all meal particles as well as skin fragments therethrough while the lower deck 32 retains the skin fragments while permitting passage of the fine meal particles therethrough.

The electric vibrator mechanism V is connected by conductors within a service cord 35 with a suitable electric controller 36 which, as shown, is installed on one of the legs of the supporting structure and is electrically connected with a source of electricity.

*Operation*

In operation the flexible red skins removed by the blanching mechanism from the peanut kernels and hearts, are forcibly ejected through the discharge 10a of the blower into duct D and thereafter are admitted with decrease in pressure of the air to the top of the cyclone collecting chamber 25, entering said chamber substantially tangentially thereof. These skins are partially in whole or divided state and partially in fragments and have adhering thereto small particles of meal or peanut meat. The collected skins by gravity, continue to drop from the lower open end of discharge tube 25a onto the rear portion of the top deck 31 of my meal removing mechanism. The entire chute 27 and decks 31 and 32 are very rapidly vibrated, both longitudinally and transversely with the result that the light flexible skins and skin fragments are agitated, tumbled and rubbed by the perforated or screened surface of the decks, thereby loosening, shaking out and rubbing off the meal particles clinging to the light skins. In this connection, the small edges defining the classifying apertures in the decks serve to tumble and rub the skins in the vibrative action thereof. The vibration with the assistance of gravity of course, causes the skins to travel downwardly over the ends of the respective decks 31 and 32.

In the form shown in Figs. 1 to 5 inclusive, the upper foraminous deck allows small fragments of skin to drop therethrough as well as the particles of meal which are detached from all skins discharged upon the upper deck. The smaller skin particles passing through deck 31 are similarly agitated, tumbled, rubbed and moved downwardly by the lower and finer mesh deck 32 whereby in the action substantially all remaining particles of meal are removed from the particles of skin and drop through the smaller perforations of the lower deck into the imperforate bottom of the trough 27. The vibration of this trough, with the assistance of gravity, moves the meal longitudinally of the trough where it flows over the forward edge and is collected and recovered in the receptacle 34. In this connection, as shown, a lip or upstanding flange 34a is provided on receptacle 34 disposed in slight spaced relation forwardly of the forward end of the trough.

While the combined vibratory action upon decks 31 and 32 is effective to usually produce the tumbling and agitating of the light skins for removing most of the meal, I prefer to employ as a combinative part of my apparatus, one or more air tubes 37 which are disposed transversely just above the bottom of trough 27 and are each connected with a suitable supply of air under pressure. The tubes 37 are provided with a series of longitudinally spaced orifices 37a for discharging upwardly through the perforated decks 31 and 32, light jets of air which increase the agitation and tumbling of the light skins as they travel over the appropriate portions of the decks. The air pressure is controlled so that it will produce in its discharge through orifice 37a, only an agitation and tumbling action with no scattering or removal of the skins from the trough.

In Fig. 6, I illustrate a different form of meal-removing apparatus which comprises a rotary, foraminous trammel 40 which is mounted below the discharge spout 25a of the cyclone collector and is inclined from the horizontal and journaled in suitable bearings 41 which receive stub shafts 42 secured to the ends of the trammel 40 by spiders 43. The trammel is driven at appropriate speed and may be constructed of metal netting or perforated sheet metal having apertures of from $3/64$ inch to $5/64$ inch in diameter. The trammel is also preferably provided with longitudinal ribs 40a which tumble and agitate the skins during longitudinal passage thereof. The trammel may further be mounted upon an electric vibrator of the type previously described and one or more transverse air tubes 44 may be provided below the same, having orifices 45a to discharge jets of air upwardly through the foraminous material.

From the foregoing description it will be seen that I have provided a simple but highly efficient method and efficient apparatus for recovering particles of meal or meat adhering to peanut skins removed from the blancher. In actual use, my method and apparatus have been effective to recover peanut meal aggregating as high as 60% of the total weight of the skins discharged from the blanching mechanism. Such recovery amounts to a saving of approximately $2\frac{1}{4}\%$ of the total weight of the shelled peanuts.

It will of course, be understood that various changes may be made in the form, details, arrangement and proportions of the parts without departing from the scope of my invention.

What I claim is:

1. The steps in the method of recovering particles of peanut meal from removed, clean peanut skins which consist in continuously discharging fragments of peanut skins with small portions of meal adhering thereto, upon a vibratory, foraminous surface having perforations approximating $6/64$ of an inch in diameter, said skins being delivered in loose, separate relation and then simultaneously agitating at high frequency vibrations and tumbling and rubbing said skins together and against said frictional surface while moving said skins over said surface to detach the small particles of meal from said skins.

2. The method of recovering peanut meal from skins normally discharged and wasted in the blanching operations of peanuts which consists in continuously separating the loose skins from the divided kernels, hearts and minute particles during the blanching operations, successively discharging the separated loose skins upon a somewhat inclined, foraminous frictional surface, said surface having closely spaced apertures approximating $6/64$ of an inch in diameter and then agitating with high frequency vibrations, said surface to tumble, rub and move said loose skins, one against each other and against said frictional surfaces to detach minute particles of meals from said skins and separating and collecting the recovered meal.

JACK W. KUEHN.

REFERENCES CITED

The following references are of record in the file of this patent:

UNITED STATES PATENTS

| Number | Name | Date |
| --- | --- | --- |
| 1,226,263 | Rustin | May 15, 1917 |
| 1,258,354 | Moore | Mar. 5, 1918 |
| 1,286,389 | Mullen | Dec. 3, 1918 |
| 2,137,753 | Flint | Nov. 22, 1938 |
| 2,217,710 | Shaler | Oct. 15, 1940 |
| 2,405,292 | Curlee | Aug. 6, 1946 |